United States Patent
Taylor et al.

(10) Patent No.: US 6,728,343 B1
(45) Date of Patent: Apr. 27, 2004

(54) USER APPLIANCE WITH VOICE HELP GUIDE

(75) Inventors: Robert L. Taylor, Clarksburg, NJ (US); Gerard A. Rutigliano, Somers, NY (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 09/039,647

(22) Filed: Mar. 16, 1998

(51) Int. Cl.[7] .............................................. H04M 1/64
(52) U.S. Cl. ....................... 379/71; 379/76; 379/88.22; 379/67.1
(58) Field of Search ................................ 704/256, 270; 340/521; 364/188; 381/51; 379/67.1, 68, 76, 88.22, 71, 77, 88.13, 88.16; 455/425, 550, 575, 90

(56) References Cited

U.S. PATENT DOCUMENTS

| | | | |
|---|---|---|---|
| 3,992,092 A | 11/1976 | Place .......................... 355/41 |
| 4,091,550 A | 5/1978 | Schrenk et al. ............. 434/366 |
| 4,489,436 A | * 12/1984 | Yoshimura et al. ......... 704/270 |
| 4,531,466 A | * 7/1985 | Hanyu et al. ............... 112/453 |
| 4,654,852 A | 3/1987 | Bentley et al. ................ 714/46 |
| 4,697,243 A | 9/1987 | Moore et al. .................. 706/59 |
| 4,821,027 A | * 4/1989 | Mallory et al. ............... 381/51 |
| 5,025,392 A | 6/1991 | Singh ........................... 706/50 |
| 5,086,385 A | * 2/1992 | Launey et al. ................ 700/83 |
| 5,107,499 A | 4/1992 | Lirov et al. ................... 714/26 |
| 5,127,005 A | 6/1992 | Oda et al. ...................... 714/26 |
| 5,408,412 A | 4/1995 | Hogg et al. .................... 701/33 |
| 5,548,714 A | 8/1996 | Becker ......................... 714/26 |
| 5,557,549 A | 9/1996 | Chang ......................... 702/183 |
| 5,583,801 A | 12/1996 | Croyle et al. ............... 702/115 |
| 5,631,745 A | * 5/1997 | Wong et al. ................. 358/434 |
| 5,983,284 A | * 11/1999 | Argade ........................ 704/270 |

* cited by examiner

Primary Examiner—Fan Tsang
Assistant Examiner—Ovidio Escalante

(57) ABSTRACT

A user appliance incorporating the invention includes a non-volatile memory for storing (i) a series of queries regarding operating problems that may be encountered in operating the user appliance; and (ii) a series of instructions on how to overcome the operating problems. Switching devices are provided which enable the user to input "yes" or "no" responses to the queries. The appliance further includes a controller that is responsive to an input from the user to cause a broadcast of the queries and instructions via a voice synthesizer. The controller further enables the user to skip certain of the queries by actuation of a switching device to input a "no" response to the controller.

6 Claims, 3 Drawing Sheets

USER APPLIANCE WITH VOICE HELP GUIDE

FIELD OF THE INVENTION

This invention relates to the field of voice response help systems and, more particularly, to a voice help system that is particularly adapted for use in small appliances such as telephones and kitchen use devices.

BACKGROUND OF THE ART

Newly purchased products come with highly detailed manuals, however, experience indicates that users rarely read the manuals and the detailed troubleshooting instructions that are contained therein. Accordingly, telephone service help offered by manufacturers receive many calls that are unnecessary, as the answers to the questions that are posed are already available in the equipment manuals.

The prior art includes a number of teachings regarding voice synthesized help systems for computerized apparatus.

In U.S. Pat. No. 5,583, 801, a sewing machine tester directs a test via synthesized voice commands which a technician hears over phones plugged into a test unit. The technician uses a keypad to input responses to a processor which controls the test unit. If the test unit determines that a measured value is within specifications, the test unit directs the technician to make a next measurement. Thus, the processor follows the flow of a program which enables the technician to be audibly directed through the test procedure.

In U.S. Pat. No. 5,127,005, a fault diagnosis expert system is described wherein a user interface provides a user with questions and responses regarding the state of a machine's problem. The system further includes an inference part which infers the cause of a machine's trouble and outputs the inference results to the user. U.S. Pat. No. 4,697,243 describes an expert system having a knowledge base of troubleshooting information for an elevator system. The expert system enables a repairman to sequence through a series of the tests, with the expert system requesting additional data that is not available to the knowledge base of the system. The expert system, with the additional information, is thus enabled to more efficiently aid the repairman.

A voice help guide is needed for use with small appliances, such as telephones, kitchen implements and other consumer devices. Further, such a voice help guide should enable the user to sequence through a series of queries in a fast and efficient manner, without having to step through each query, in sequence.

Accordingly, it is an object of this invention to provide an improved voice help guide for use with telephones, kitchen implements and other consumer devices.

It is another object of this invention to provide an improved voice help guide which enables the user to rapidly step through a series of troubleshooting queries.

It is yet another object of this invention to provide an improved voice help guide which requires minimal storage of data for its implementation.

SUMMARY OF THE INVENTION

A user appliance incorporating the invention includes a non-volatile memory for storing (i) a series of queries regarding operating problems that may be encountered in operating the user appliance; and (ii) a series of instructions on how to overcome the operating problems. Switching devices are provided which enable the user to input "yes" or "no" responses to the queries. The appliance further includes a controller that is responsive to an input from the user to cause a broadcast of the queries and instructions via a voice synthesizer. The controller further enables the user to skip certain of the queries by actuation of a switching device to input a "no" response to the controller.

DETAILED DESCRIPTION OF THE PREFERRED EMBODIMENT

Figure 1:
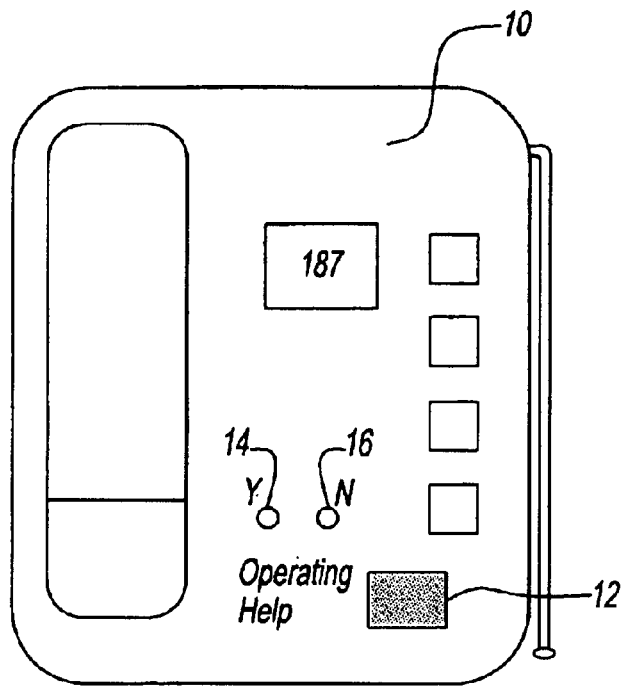
FIG. 1 is a top plan view of a cordless telephone which incorporates the invention.
Figure 2:
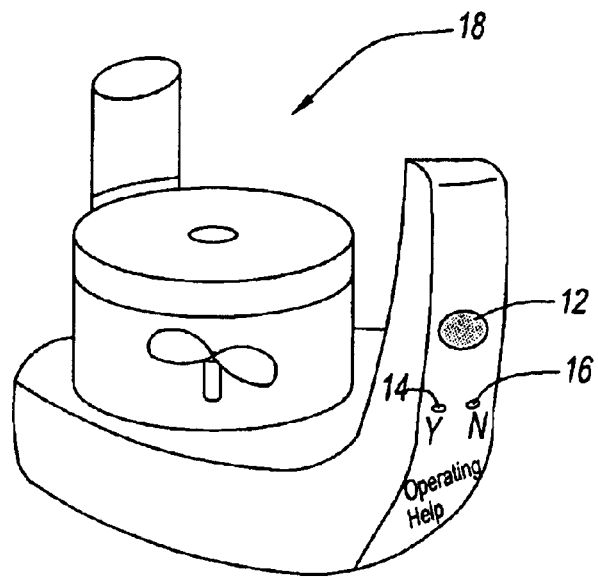
FIG. 2 is a perspective view of a food processor that incorporates the invention.

Referring now to FIG. 1, a cordless telephone 10 incorporates a user voice guide which broadcasts help messages through a speaker 12. A pair of input switch buttons 14 and 16 enable a user to enter "yes" and "no" responses, respectively, to queries which are broadcast by the user voice guide via speaker 12. FIG. 2 illustrates a perspective view of a food processor 18 which also incorporates the user voice guide of the invention. Food processor 18 incorporates a speaker 12 and input switches 14 and 16 to enable the user entry of "yes" and "no" responses to broadcast queries.

Figure 3:
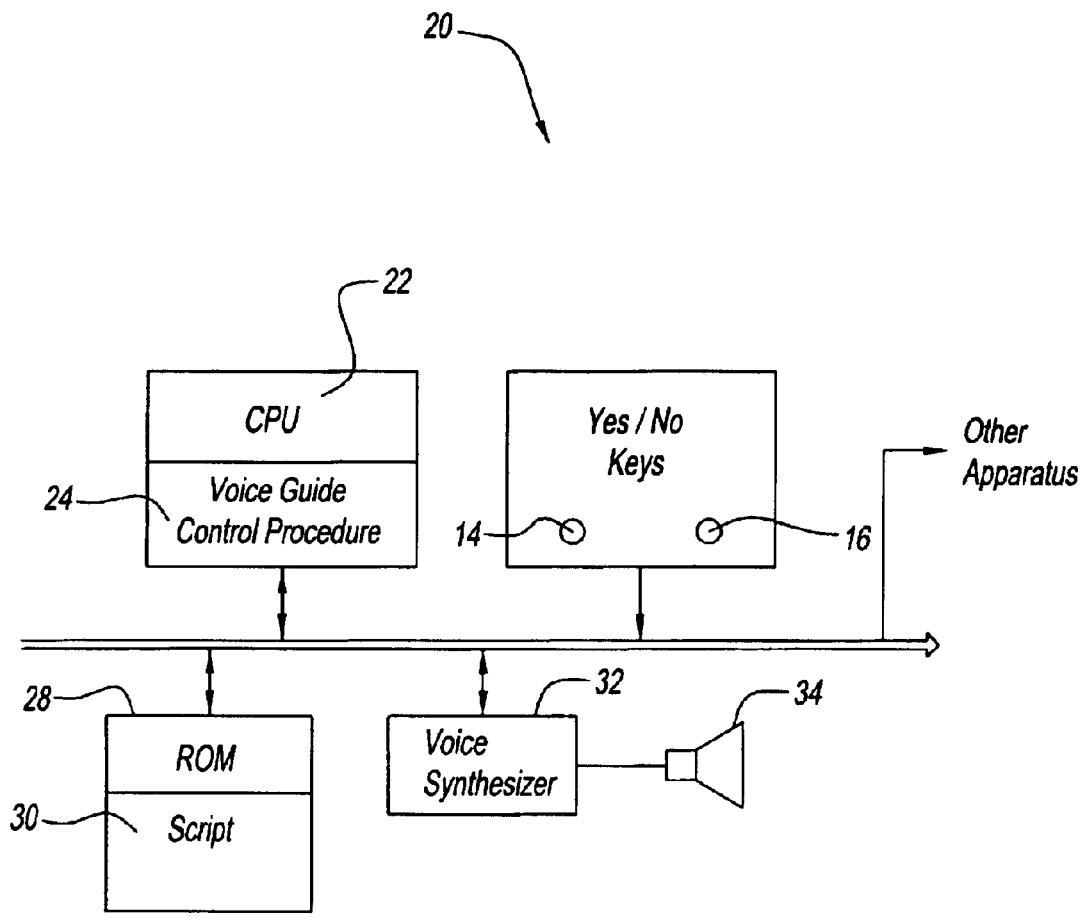
FIG. 3 is a high-level block diagram of a computer system which is incorporated in the devices shown in FIGS. 1 and 2.

FIG. 3 illustrates a block diagram of computer apparatus 20 which embodies the voice help guide of the invention. Computer apparatus 20 includes a central processing unit (CPU) 22 which incorporates a voice guide control procedure 24 that enables operation of the invention. Yes/no keys 14 and 16 are coupled via a bus system 26 to CPU 22. A read-only memory 28 includes a script 30 which comprises the queries and corresponding troubleshooting suggstions in response to a user's actuation of yes/no keys 14 and 16, respectively. A voice synthesizer 32 is also coupled to bus 26 and is controlled by voice guide control procedure 24 to audibly output queries and corresponding answers via speaker 34.

As only a small portion of the capability of CPU 22 is employed to operate voice guide control procedure 24, CPU 22 can also be employed to control other apparatus in the appliance in which the voice guide system is incorporated. For instance, in cordless telephone 10, shown in FIG. 1, CPU 22 can be utilized to respond to input dialing signals, to provide connections to a central office. In the case of food processor 18, shown in FIG. 2, CPU 22 can be utilized to control timer and other input functions that are needed during the operation of the food processor.

Figure 4:
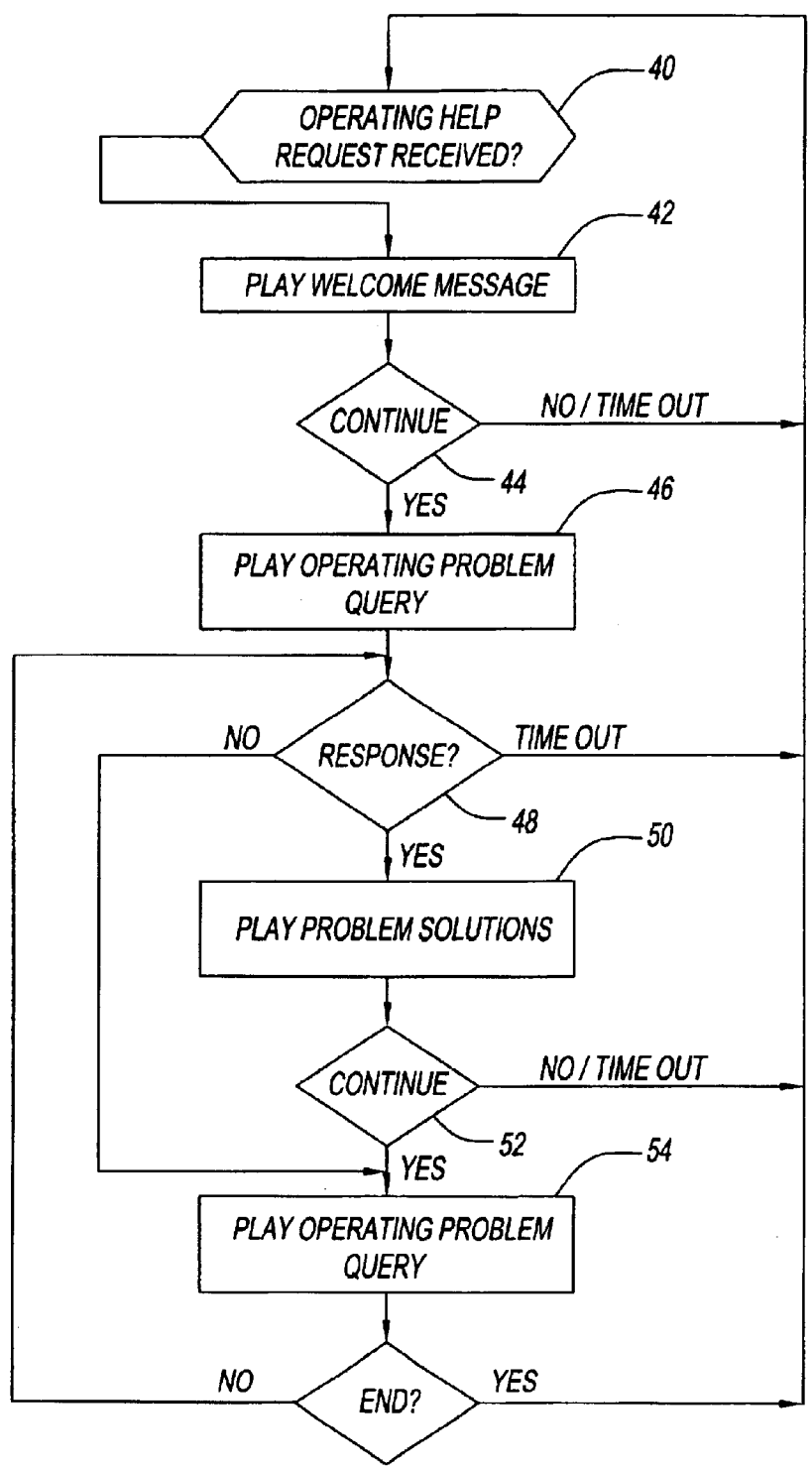
FIG. 4 is a high-level logic flow diagram which illustrates the operation of the computer system shown in FIG. 3.

Turning now to FIG. 4, the operation of computer system 20 will be described, during performance of voice guide control procedure 24. Initially, CPU 22 awaits a user input indicating that operating help is requested (step 40). Until the request for operating help is received, the procedure recycles. To invoke voice guide control procedure 24, the user depresses key 14, for instance, and voice guide control procedure 24 reacts by playing a welcome message (step 42). The welcome message requests an indication from the user as to whether the procedure is to continue or not. If a no response is detected or a timeout occurs, the procedure recycles (step 44).

By contrast, if the user the presses yes key 14, the procedure moves to step 46 wherein the user is asked if a particular problem is being experienced (step 46). If no response is received to the query, the procedure recycles after a timeout (decisions step 48). If a "no" response is received, as a result of the user depressing no key 16, the procedure skips the proposed troubleshooting solutions and moves down to a next operating problem query (decision step 54). In this manner, the user is enabled to rapidly move through a series of problem queries until a particular query is reached which addresses the user's problem.

If, in response to an operating problem question stated in step 46, the user responds with a "yes" input, a series of troubleshooting suggestions are played (step 50). If one of the proposed suggestions solves the user's problem, a system timeout or a no answer to a question asking whether to continue, will cause the procedure to recycle (decision step 52). If the user indicates a desire to continue (decision step 52), voice guide control procedure 24 causes a further operating problem question to be played (step 54). Thereafter, the procedure recycles to decision step 48 to await the user's answer as to whether the particular operating problem has been experienced, has not been experienced or a timeout occurs. Assuming that the user indicates that the problem has been experiencedm, a set of troubleshooting solutions are played.

The above indicated procedure continues until the entire script of operating problem questions and associated problem solutions have been played. Note that a "no" response after an operating problem question has been posed enables the user to sequence down through a series of operating problem questions, without having to listen to an intervening play of troubleshooting solutions to problems that do not interest the user.

Hereafter is presented a series of problem queries and proposed solutions from a script for the cordless telephone of FIG. 1.

User presses Yes to begin
"Welcome to the Voice Help Guide Press Yes to begin."
User presses Yes
"Are you having trouble setting greeting?
Press Yes or No."
If user presses No, move to the next question.
User presses Yes.
"Press and hold geeting button for five seconds.
Wait to speak after the beep.
Leave a message longer than 2 seconds.
Press Yes to continue or No to stop."
If user presses No, turn off.
User presses Yes.
"Are you having trouble getting dial tone?
Press Yes or No."
If user presses No, move to the next question.
User presses Yes.
"Place handset back into the cradle for five seconds.
charge telephone for 10 hours before initial use.
Return handset to base.
Charge LED should light when handset is in cradle.
Press Yes to continue or No to stop"
If user presses No, turn off.
User presses Yes.
"Are you experiencing static when you talk on the telephone?
Press Yes or No."
If user presses No, move to the next question.
User presses Yes.
"Move closer to the base.
Is base antenna fully extended?
Press channel button.
Press Yes to continue or No to stop"
If user presses No, turn off.
User presses Yes.
"Are you having trouble accessing your machine remotely?
Press Yes or No."
If user presses No, move to the next question.
User presses Yes.
"Use security code on bottom of the base.
Enter security code at end of greeting.
Enter each digit for 3 seconds.
Press Yes to continue or No to stop."
If user presses No, turn off.
User presses Yes.
"Are you having trouble receiving messages'
Press Yes or No."
If user presses No, move to the next question.
User presses Yes.
Is answer on/announce only switch set to answer on?
Is machine turned on?
If power failure occurs, reset machine.
If message capacity is full, erase saved messages.
Press Yes to continue or No to stop.
User presses Yes.
"Thank you for using the Voice Help Guide. If your specifec question has not been answered, call our toll free help line at . . . "

It should be understood that the foregoing description is only illustrative of the invention. Various alternatives and modifications can be devised by those skilled in the art without departing from the invention. For example, while FIG. 1 illustrates Yes and No keys for use by the user in responding to queries, the keys may be otherwise designated by numerals, such as "1" and "2" or by different colors, shapes, etc. Accordingly, the present invention is intended to embrace all such alternatives, modifications and variances which fall within the scope of the appended claims.

What is claimed is:

1. A telephone comprising:
   non-volatile memory disposed in said telephone for storing (i) a series of queries regarding operating problems of the telephone that may be encountered in operating the telephone, and (ii) a series of instructions as to how to overcome the operating problems;
   switch means for enabling a user to input "yes" or "no" responses in response to said queries;
   means for broadcasting said queries and instructions to said user; and
   control means responsive to an input from said switch means, to operate in conjunction with said non-volatile memory and said broadcasting means, and to cause a broadcast of said queries and instructions to said user, said control means enabling said user to skip certain of said queries and instructions by actuation of said switch means to input "no" responses.

2. The user appliance as recited in claim 1, wherein said control means only enables said user to skip a series of said instructions when a "no" signal is input after an immediately preceding query is broadcast.

3. The user appliance as recited in claim 2, wherein said control means reverts to a quiescent state when said user has entered no data during a time-out period.

4. The user appliance as recited in claim 1, wherein said appliance comprises a cordless telephone and an answer machine.

5. The user appliance as recited in claim 4, wherein said control means is a microprocessor apparatus that is also connected to control said answering machine and cordless telephone.

6. The user appliance as recited in claim 1, wherein said appliance comprises a device that is adapted for kitchen use.

* * * * *